United States Patent
Umezawa et al.

[15] 3,681,491
[45] Aug. 1, 1972

[54] BLEOMYCIN AND PROCESSES FOR THE PREPARATION THEREOF

[72] Inventors: Hamao Umezawa, 23 Kita-4-chome Toyotama, Nerima-ku, Tokyo; Kenji Maeda, 258 Gotanda-1-chome, Shinagawa-ku, Tokyo; Yoshiro Okami, 18-3 Denenchofu-6; Tomio Takeuchi, 273 Imaizumicho, both of Ota-ku, Tokyo, all of Japan

[22] Filed: Dec. 3, 1965

[21] Appl. No.: 511,448

Related U.S. Application Data

[63] Continuation-in-part of Ser. No. 345,233, Feb. 17, 1964, abandoned.

[30] Foreign Application Priority Data

March 5, 1963 Japan..........................38/10177

[52] U.S. Cl.....................................424/115, 195/80
[51] Int. Cl. ...............................................A61k 21/00
[58] Field of Search......167/65 AB; 195/80; 424/115

[56] References Cited

OTHER PUBLICATIONS

The Pfizer Handbook of Microbioc Metabolities, 1961, page 601.

*Primary Examiner*—Jerome D. Goldberg
*Attorney*—Curtis W. Carlson, Richard H. Brink, Robert B. Simonton and Herbert W. Taylor, Jr.

[57] ABSTRACT

An antibiotic complex designated bleomycin was produced by fermentation of *Streptomyces verticillus* A.T.C.C. 15003 and found to inhibit the growth of Gram-negative and Gram-positive and acid-fast bacteria as well as certain plant pathogens and to inhibit the growth of HeLa cells in tissue culture and to inhibit the growth of certain experimental tumors in mice.

7 Claims, No Drawings

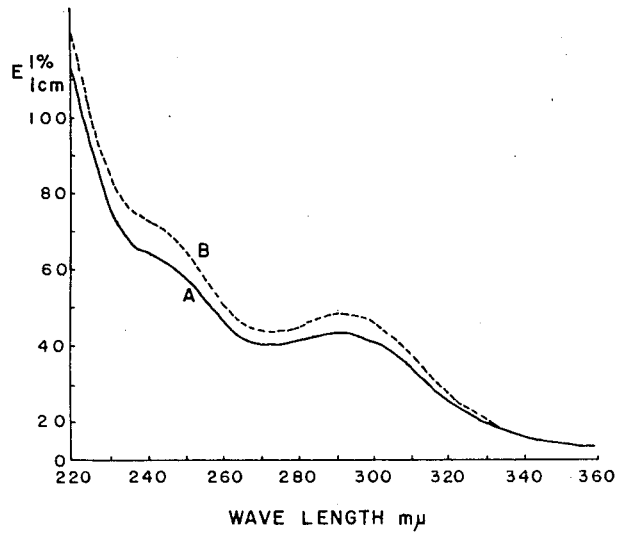

ULTRAVIOLET ABSORPTION SPECTRA
OF BLEOMYCIN A AND
BLEOMYCIN B

ULTRAVIOLET ABSORPTION SPECTRA OF BLEOMYCIN A AND BLEOMYCIN B

FIG. I

ULTRAVIOLET ABSORPTION SPECTRA OF BLEOMYCIN Cu-At2, BLEOMYCIN Cu-At5 AND BLEOMYCIN Cu-Bt2

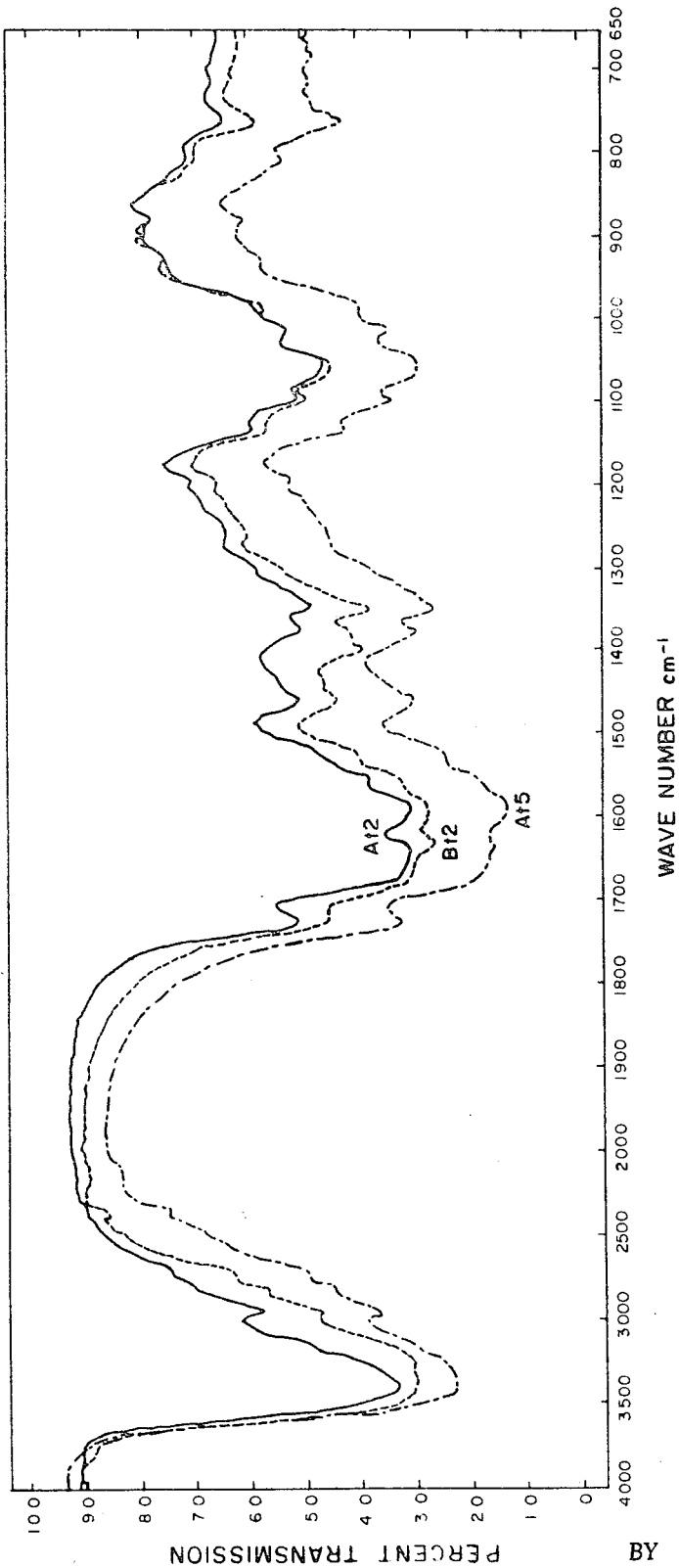

BLEOMYCIN AND PROCESSES FOR THE PREPARATION THEREOF

This application is a continuation-in-part of our prior, copending application Ser. No. 345,233, filed Feb. 17, 1964 and now abandoned.

This invention relates to a new antibiotic, bleomycin, and its salts in the pure and the crude state and processes for their production and their isolation, especially their production by the cultivation of microorganisms followed by extraction and isolation. The present invention provides bleomycin as its base or acid addition salt either in purified or crude state and either in the solution or the solid state. Bleomycin inhibits the growth of Gram-negative and Gram-positive bacteria including acid-fast bacteria. It exhibits a therapeutic effect against experimental infection of mice with pathogenic bacteria and against experimental animal tumors. On the basis of fundamental studies, it promises to be useful for therapy against bacterial infection in man or animals. In addition, it is inhibitory against the growth of plant-pathogenic organisms and it is effective in prevention or suppression of diseases of rice, pea, wheat or other plants.

There is now provided, according to the present invention, an antibiotic substance effective in inhibiting the growth of Gram-positive bacteria, Gram-negative bacteria, plant pathogens and animal tumors, selected from the group consisting of bleomycin A and bleomycin B, and the acid addition salts thereof, each of said bleomycins being a substance which is soluble in water and methanol and substantially insoluble in ethanol, butanol, acetone, ethylacetate, ether, chloroform and benzene, which forms salts with acids, which exhibits maxima at 244 m$\mu$ and 295 m$\mu$ in the ultraviolet absorption, which gives positive Pauly, Ehrlich and Dragendorf tests and negative Fehling, Tollens, Anthrone and ferrich chloride tests, while bleomycin A1, A2, A3, B1, B2, B3, B4 and B5 give a negative ninhydrin test and A4, A5 and A6 give a positive ninhydrin test, while all bleomycins A, that is A1, A2, A3, A4, A5 and A6, give a negative Sakaguchi reaction and all bleomycins B, that is B1, B2, B3, B4, B5, give a positive Sakaguchi reaction and which contain carbon, hydrogen, nitrogen, sulfur and oxygen with or without copper.

Figure 3:
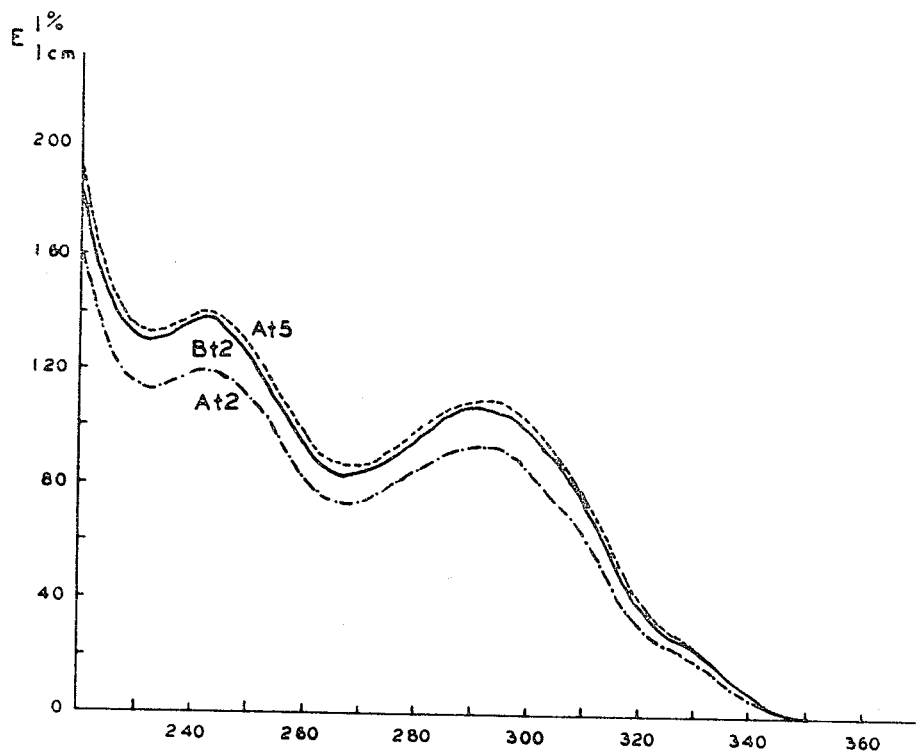

As later described, further purification indicated that bleomycin A could be separated into six components designated A1, A2, A3, A4, A5, A6, among which usually A2 and A5 were the main components and that bleomycin B could be separated into B1, B2, B3, B4, B5, among which B2 and B4 were the main components. FIGS. 3 and 4 show the ultraviolet and infrared absorption spectra, respectively, of bleomycin Cu–At2, bleomycin Cu–At5 and bleomycin Cu–Bt2.

There is further provided according to the present invention, a process for the production of bleomycin which comprises cultivating a strain of *Streptomyces verticillus* in a medium until a sufficient amount of bleomycin is accumulated. The bleomycin-producing organism was isolated by the present inventors from a soil sample collected at the coal-mine in Kaho-Gun, Fukuoka-prefecture, Japan. The isolate producing bleomycin was numbered as B80–Z2 by the inventors and it was deposited in Division of Mycology, Department of Antibiotics, National Institute of Health, Japan, under the strain number NIHJ 424. This strain was deposited in the American Type Culture Collection, Washington, D.C., under the ATCC accession number 15003.

This strain (B80–Z2) possessed the following characteristics:

1. Microscopic characteristics:
    Aerial mycelium is developed from fine branched vegetative mycelium. Aerial mycelium forms whorls. In general, the photography of spores on whorls by an electron microscope is difficult. But, in the case of this strain, the spore surface seemed to be smooth.
2. Cultural characteristics on various media:
    1. On Czapek-Dox agar plate, incubated at 27° C.:
    Pale yellowish-brown growth with good formation of white aerial mycelium. Scant brownish-yellow soluble pigment.
    2. On Krainsky's glucose asparagine agar plate, incubated at 27° C.:
    Growth is pale brownish with yellowish tinge. Good formation of aerial mycelium colored with pale dull greenish gray. No soluble pigment.
    3. On starch agar plate, incubated at 27° C.:
    Growth is yellowish. Aerial mycelium is white to grayish-white. Slight brownish soluble pigment. None or weak hydrolysis of starch around the growth.
    4. On calcium malate agar plate, incubated at 27° C.:
    Colorless growth with scant white aerial mycelium. No soluble pigment.
    5. In peptone solution containing 0.2% $NaNO_3$, incubated at 37° C.:
    Pale brownish-yellow growth is formed on the liquid surface as the ring along with the test tube. Also a small amount of mycelium mass is observed at the bottom. White to pale brownish or yellowish-gray aerial mycelium on the surface growth. No soluble pigment. Nitrite from nitrate is detected by the starch-iodine reaction.
    6. On bouillon agar slant, incubated at 37° C.:
    Colorless to cream-colored growth with occasional formation of white aerial mycelium. No soluble pigment.
    7. On Loeffler's coagulated serum slant, incubated at 37° C.: Colorless to cream-colored growth with scant white aerial mycelium. No soluble pigment and no liquefaction of coagulated serum.
    8. On blood agar plate, incubated at 37° C.:
    Reddish-brown growth with white aerial mycelium. No soluble pigment and no hemolysis.
    9. On gelatin stab, incubated at 18°–20° C.:
    Colorless to pale brownish growth. White aerial mycelium. No soluble pigment and no liquefaction of gelatin.
    10. On egg medium slant, incubated at 37° C.:
    Cream-colored growth with abundant, snowy-white aerial mycelium. No soluble pigment.
    11. On skimmed milk, incubated at 37° C.:
    Cream-colored growth white aerial mycelium on the liquid surface along with test tube. No soluble pigment. Weak coagulation and no or weak peptonization.

12 On potato plug, incubated at 27° C.:
Yellowish-brown growth with powdery white to gray aerial mycelium with brownish tinge. No soluble pigment.

13. On carrot plug, incubated at 27° C.:
Cream-colored growth with brownish tinge. White snowy aerial mycelium. No soluble pigment.

14. Carbohydrate utilization for growth on Czapek's basal agar medium:
Dextrin, glycerol, starch, glucose and maltose are utilized for good growth. Fructose, inositol and mannose give varied results. No or scant growth was given by arabinose, galactose, inulin, lactose, mannitol, raffinose, rhamnose, salicin, sorbitol, sorbose, sucrose, xylose, sodium acetate, sodium citrate and sodium succinate.

Summarizing the above, the strain B80–Z2 belongs to the genus *Streptomyces*, and is characterized by formation of whorl, pale brownish-yellow growth, white to grayish aerial mycelium, non-chromogenic type, no or weak hydrolysis of starch and proteolytic action.

Among the known species of *Streptomyces*, *S. verticillus*, *S. Cinnamoneus* and *S. flavopersicus* are known to be the whorl-forming and non-chromogenic type. In the next table, the strain B80–Z2 and the known species are compared.

| Strains Properties | B80–Z2 | S. verticillus | S. cinnamoneus | S. flavopersicus |
|---|---|---|---|---|
| Whorl | + | + | + | + |
| Spiral | − | − | − | − |
| Chromogenecity | − | − | − | − |
| Hydrolysis of Starch | ± | ± | ++ | ? |
| Nitrate Reduction | + | − | − | + |
| Proteolysis | ± | + | ++ | ++ |
| Color of aerial mycelium on synthetic med. | grayish with olive tinge | grayish olive with pinkish tinge | cinnamon | pale yellowish with pinkish tinge |
| Color of growth | colorless, yellowish to brown | cream color | cream color | yellowish |
| Antibiotic produced | Bleomycin | Phleomycin | Cinnamycin Duramycin Heptaene | Actinospectacin |

As shown in the above table, they are very similar to each other except for minor differences. Among the above species, the strain B80–Z2 resembles most *S. verticillus*, while *S. cinnamoneus* possesses cinnamon-colored aerial mycelium, strong hydrolysis of starch and strong proteolytic action, which are not shown by the strain B80–Z2. *S. flavopersicus* forms a pale yellowish aerial mycelium on the synthetic agar and shows significant proteolytic action in the skimmed milk and the gelatin medium, by which the strain B80–Z2 is differentiated. In addition, the strain B80–Z2 grows very well in the medium consisting of starch as the carbon source and soybean flour as the nitrogen source and it is suggested that hydrolysis of starch and proteolysis can be varied depending on cultural conditions. Therefore, the differences between the strain B80–Z2 and *S. verticillus* in respect of starch hydrolysis and proteolytic action is not considered to be significant. *S. verticillus* forms usually pinkish-gray aerial mycelium, but occasionally olive gray aerial mycelium, which is very much similar to that of the strain B80–Z2. In other respects, such as nitrate reduction, there are differences between them at some extent, but the majority of their characteristics are common between them and it is considered to be proper to conclude that the strain B80–Z2 belongs to *S. verticillus*.

It is generally recognized that actinomycetes are easily mutated. This invention is not to be limited to the production of bleomycin by *S. verticillus*, the strain B80–Z2 or organisms fully answering the above description. *S. verticillus* in this patent application includes the strain B80–Z2 and its artificial and natural mutants. In other words, in this patent application all organisms which produce bleomycin are included in *S. verticillus*, except those which are differentiated from *S. verticillus* without any ambiguity or any uncertainty.

When *S. verticillus* is cultivated under proper conditions, bleomycin is produced. Mycelia or spores of a bleomycinproducing organism are inoculated to a proper medium and fermented aerobically to yield the cultural product containing bleomycin. Bleomycin production can be achieved by the cultivation on a solid medium but it is recommended that it be cultivated in a liquid medium for large-scale production. The incubation temperature may be any temperature at which a bleomycin-producing strain is able to grow, but it is preferable to conduct the fermentation at 25°–35° C., especially at 27°–32° C. The medium for the production of bleomycin consists of nitrogen sources, carbon sources, inorganic salts with or without stimulatory factors for production and others. Carbohydrates, fats or oils can be used as the carbon source. For instance, starch, glucose, glycerol, maltose, dextrin and sucrose are used in either purified or crude state. As nitrogen sources, soybean flour, meat extract, distiller's solubles, peanut flour, peptone, fish meal, yeast extract, corn steep liquor, nitrate, ammonium salts, urea, etc. are used. Inorganic salts such as sodium chloride, potassium chloride, magnesium sulfate, calcium carbonate, phosphates etc. are added if necessary. Heavy metal salts such as copper, manganese, iron, zinc, etc. are added to the medium if necessary. All materials which are known to be used for the cultivation of actinomycetes, such as those indicated in Canadian Pat. No. 513,324, British Pat. Nos. 730,341, 736,325, U.S. Pat. Nos. 2,691,618, 2,658,018, 2,653,899, 2,586,762, 2,516,080, 2,483,892, 2,609,329, and 2,709,672 are available for the production of bleomycin. To prevent foaming during the fermentation, all known antifoaming agents such as paraffin, fat, soybean oil, silicone resin are utilized. All other known methods for the fermentation of penicillin, streptomycin or for the production of other antibiotics can be employed for the production by fermentation of bleomycin.

Experimental methods employed in this invention are as follows unless otherwise noted specifically:

1. Shaking culture:

The medium (100 cc.) was placed in a Sakaguchi flask of 500 cc. volume and sterilized at 120° C. for 20 minutes. Mycelia, spores or their mixture of the bleomycin-producing strain were inoculated into the above sterilized medium and cultured on a shaking machine (120 strokes per minute with 8 cm. amplitude) at 27°–29 C. One ml. of second day's broth was inoculated as the inoculum into 100 cc. of a medium in a flask of 500 cc. volume and cultured.

2. Tank culture:

a. Culture in a jar fermentor: A stainless steel jar fermentor of 30 liters' volume was charged with 10 liters of a medium and sterilized at 120° C. for 30 minutes. Fermentation was carried out under aeration of 10 liters per minute and with stirring at 500 rpm. The temperature was kept at 27°–29° C. and soybean oil or silicone resin was used as the antifoam.

b. Culture in a stainless steel tank of 400 liters' volume: A tank was charged with 180 liters of a medium and sterilized at 120° C. for 30 minutes. Aeration was 200 liters per minute and the stirring was 200 rpm. The temperature was kept at 27°–20° C. Soybean oil or silicone resin was employed as the antifoam.

3. Assay of bleomycin:

*Mycobacterium phlei* NIHJ was used as the test organism and the cylinder plate method was employed. the cylinder plate assay method for penicillin. A lot of bleomycin which was extracted from culture filtrate by the ion exchange resin process followed by Sephadex chromatography was designated as the standard. The activity was expressed by the weight of the standard.

The bleomycin-producing strain was first shake-cultured by the inventors in the following medium. The medium consisted of 1.0 percent glucose, 1.0 percent starch, 0.75 percent meat extract, 0.75 percent peptone and 0.3 percent sodium chloride. The initial pH was adjusted to 7.0. Then at 4 days' culture the pH of the broth was 7.3. This broth showed inhibition zone of 30 mm. in the cylinder plate method.

Bleomycin production was examined in media consisting of various kinds of carbon and nitrogen sources by the shaking culture. The results of production of bleomycin and the pH of cultured broth are shown in the following table.

(I).—TEST OF CARBON SOURCES

[Basal medium consists of 0.75% meat extract, 0.75% peptone, 0.3% NaCl]

| Medium Number | Carbon sources | 2nd Days | | 3rd | | 4th | | 5th | |
|---|---|---|---|---|---|---|---|---|---|
| | | pH | Mcg./ml. | pH | Mcg./ml. | pH | Mcg./ml. | pH | Mcg./ml. |
| 1 | {1% glucose, 1% starch} | 7.8 | 0.25 | 6.2 | 0.37 | 7.4 | 0.36 | 7.8 | 0.38 |
| 2 | 2% glucose | 7.0 | 0.29 | 6.8 | 0.34 | 7.4 | 0.38 | 7.6 | 0.37 |
| 3 | 2% starch | 5.4 | 0.07 | 5.4 | 0.10 | 7.0 | 0.36 | 7.6 | 0.47 |
| 4 | 2% lactose | 8.2 | 0.27 | 8.0 | 0.25 | 8.0 | 0.32 | 8.8 | 0.11 |
| 5 | 2% sucrose | 8.0 | 0.32 | 8.2 | 0.17 | 8.2 | 0.17 | 8.2 | 0.14 |
| 6 | 2% maltose | 8.2 | 0.26 | 6.6 | 0.10 | 4.8 | 0.37 | 5.0 | 0.37 |
| 7 | 2% dextrin | 5.8 | 0.05 | 6.6 | 0.35 | 7.2 | 0.44 | 7.6 | 0.38 |
| 8 | 2% glycerol | 6.8 | 0 | 6.4 | 0 | 6.2 | 0.07 | 6.4 | 0.18 |

(II).—TEST OF NITROGEN SOURCES

[Basal medium consisted of 1% glucose, 1% starch and 0.3% NaCl]

| Medium Number | Nitrogen sources and salts | 2nd Days | | 3rd | | 4th | | 5th | | 6th | |
|---|---|---|---|---|---|---|---|---|---|---|---|
| | | pH | Mcg./ml. | pH | Mcg./ml. | pH | Mcg./ml. | pH | Mcg./ml. | pH | Mcg./ml. |
| 1 | {0.75% meat extract, 0.75% peptone} | 6.4 | 0.27 | 7.0 | 1.23 | 7.2 | 1.41 | 7.4 | 0.59 | 8.0 | 0.24 |
| 2 | {1.5% soybean flour, 0.1% $K_2HPO_4$, 0.05% $MgSO_4$} | 6.4 | 0 | 6.4 | 0.06 | 6.6 | 0.41 | 7.0 | 1.40 | 7.8 | 0.90 |
| 3 | {1% soybean flour, 0.1% $K_2HPO_4$, 0.05% $MgSO_4$, 0.5% corn steep liquor} | 6.8 | 0.03 | 7.2 | 0.06 | 7.0 | 0.38 | 7.4 | 0.45 | 8.6 | 0.29 |
| 4 | {0.74% meat extract, 0.75% peptone, 0.3% yeast} | 7.2 | 0.25 | 7.6 | 1.35 | 7.6 | 1.00 | 8.2 | 0.43 | 8.2 | 0.39 |
| 5 | 2% corn steep liquor | 6.8 | 0 | 6.8 | 0.06 | 6.8 | 0.22 | 6.8 | 0.06 | 7.2 | 0.06 |
| 6 | {1.5% soybean flour, 0.3% yeast} | 6.6 | 0 | 6.6 | 0.13 | 6.4 | 0.31 | 7.2 | 1.19 | 8.2 | 0.20 |
| *7 | {0.75% meat extract, 0.75% peptone} | 7.0 | 0.09 | 6.6 | 0.79 | 7.2 | 1.71 | 7.4 | 1.47 | 8.0 | 1.44 |

*In Medium No. 7, starch was present at 2.0%.

*Mycobacterium phlei* was shake-cultured in glycerol bouillon at 27°–29° C. for one week and was used as the test organism. The medium for the cylinder plate method consisted of 1.0 percent glycerol, 1.0 percent meat extract, 1.0 percent peptone, 0.2% NaCl and 2.0 percent agar. Five ml. of 1.5 percent malachite green solution was added to 1,000 ml. of the medium. The pH was adjusted to 7.0. After the sterilization at 120° C. for 20 minutes, to this medium of 95 cc., 5 cc. of *M. phlei* culture was added and used for the seed layer. The other procedures were the same as those employed in The above results are examples of tests. Starch, dextrin, glucose, lactose and maltose are examples of carbon sources useful for the production of bleomycin. Soybean meal, meat extract, peptone and yeast are examples of nitrogen sources useful for the production of bleomycin.

A medium consisting of 2.5 percent starch, 0.5 percent glucose, 3.5 percent soybean meal, 0.1% $K_2HPO_4$, 0.05 percent zinc sulfate and 0.01% $CuSO_4 \cdot H_2O$ (pH 7.0) is an example of media useful for the production of bleomycin.

A strain which was selected from the original culture of the strain No. B80–Z2 by the single colony selection was shake-cultured in the above medium and yielded 100 mcg./ml. of bleomycin after the 7–10 days shaking of the culture. At the time of maximum production the pH of the cultured broth was 8.0–8.2. It is generally known that compositions of high yielding media for the production of an antibiotic vary depending on strains, even in cases in which they derived from the same original strain. It is the same in the case of the bleomycin-producing strains. The media compositions most suitable for the bleomycin production must be varied depending on strains obtained by monospore-selection or by the treatment of the ultraviolet irradiation or others. High production of bleomycin can be achieved by known procedures, for instance, by the improvement of the strain by monospore-selection, by treatment with ultraviolet light, X-ray or other mutagens and by the selection of media suitable for the bleomycin production by each improved strain.

Bleomycin exists mainly in the liquid part of the fermented broth. The liquid part containing bleomycin is separated from the solid mass in the cultured broth by known procedures such as filtration or centrifugation. As described later, bleomycin is adsorbed on an ion exchange resin. After the removal of the solid mass from the cultured broth, bleomycin is adsorbed on the resin. However, the ion exchange resin process can also be applied for adsorption of bleomycin directly from the cultured broth after removal of large particles in the broth by a proper screen. Bleomycin in the cultured broth or in the filtrate is stable enough for evaporation in vacuo or spray drying. The dried material thus obtained can be applied for the agricultural use.

Bleomycin is not practically transferred from the aqueous solution to solvents such as butanol, ethyl acetate, ether or benzene. Solvent extraction can be utilized for elimination of some impurities, if desired.

An aqueous solution containing bleomycin can be concentrated by distillation in vacuo and dried. During this procedure, it is preferable to keep the pH at 6–7, since bleomycin is most stable in this pH range. Washing of the dried material with solvents such as acetone, butanol, ethanol or ethyl acetate in which bleomycin is practically insoluble is useful to remove impurities soluble in the used solvents. Bleomycin in the dried material can be dissolved in water or methanol. Bleomycin dissolved in water or methanol can be precipitated with solvents in which bleomycin is insoluble and which are miscible with water or methanol.

Bleomycin in aqueous solution or in cultured broth is adsorbed on activated carbon and is eluted from the carbon at acid pH by aqueous methanol, aqueous ethanol, aqueous acetone or water-saturated butanol. The yield of bleomycin in this procedure was usually less than that obtained by an ion exchange resin process which is described below.

Bleomycin is basic and water-soluable, therefore, an ion exchange resin process can be employed for extraction and purification of bleomycin in high yield. Ion exchange resins which have carboxyl or phenol radicals are able to adsorb bleomycin on the basis of its basic nature and on the basis of Van der Waal's power. Cation exchange resins of the carboxyl type and carboxymethyl cellulose are suitable adsorbents for extraction and purification of bleomycin. For an example, bleomycin is adsorbed on a cation exchange resin such as Amberlite IRC–50 (product of Rohm and Haas Co.). The use of this resin in H form is more preferable than Na form. This resin is placed in a column and is converted to H form. Then an aqueous solution containing bleomycin, e.g., culture filtrate adjusted to pH 4 – 6.5, is passed through the column. Thereafter the column is washed with water. Then elution is made with dilute hydrochloric acid. The eluate of bleomycin, thus obtained, is adjusted to pH 5–7 and is lyophilized or dried in vacuo. Bleomycin in the eluate can be precipitated by addition of solvents, for instance, ten volumes of acetone, in which bleomycin is insoluble, and the precipitate is dried.

Bleomycin in the dried powder is dissolved in methanol. From the methanol solution bleomycin can be precipitated by addition of acetone, ether, etc. Washing of the powder containing bleomycin by ethanol is useful to remove impurities.

Depending on the molecular size of bleomycin, methods of separating substances on the basis of molecular sieves, such as those using Sephadex, is useful for the purification of bleomycin. A bleomycin aqueous solution is applied on Sephadex g-25 column. The latter is a commercially available, cross-linked dextran polymer which forms a gel with water and acts as a molecular sieve, absorbing molecules smaller than about 3,000 molecular weight. The active eluate is concentrated in vacuo or lyophilized. Thus, bleomycin is purified. By Sephadex column chromatography bleomycin was separated into bleomycin A having Rf value 0.94–0.88 and bleomycin B having Rf 0.70–0.66. This Rf value was shown by paper chromatography using 10 percent ammonium chloride. Other than these two main components of bleomycin, two or three antibacterial substances were shown to be present in a very small quantity. The purified bleomycin A and B, thus obtained, is white or white with pale green to bluish tinge.

When tested by paper chromatography using 10 percent ammonium chloride, the cultured broth and the extract obtained by the process using Amberlite IRC–50 from the cultured broth, showing usually two large spots and two or three small spots which have antibacterial activity against *Mycobacterium phlei*. Bleomycin in this application means each of the substances shown in the two main spots or the mixture thereof. In other words, the mixture of these two main substances or each of those is called bleomycin, unless otherwise noted. Among these substances, the substance of Rf 0.94–0.88 is designated bleomycin A and that of Rf 0.70–0.66 bleomycin B. Except for the differences of Rf values, bleomycin A and B are very similar to each other.

The properties of bleomycin are as follows: Bleomycin is pale greenish or bluish white powder. A clear melting point is not observed, but the separated powder of bleomycin A and bleomycin B decomposed at over 106° C.

Bleomycin and its hydrochloride are soluble in water, soluble in methanol, slightly soluble in ethanol, and hardly soluble in acetone, ethyl acetate, butyl acetate and ether.

Bleomycin is adsorbed on a cation exchange resin and eluted with aqueous inorganic acids.

Figure 1:
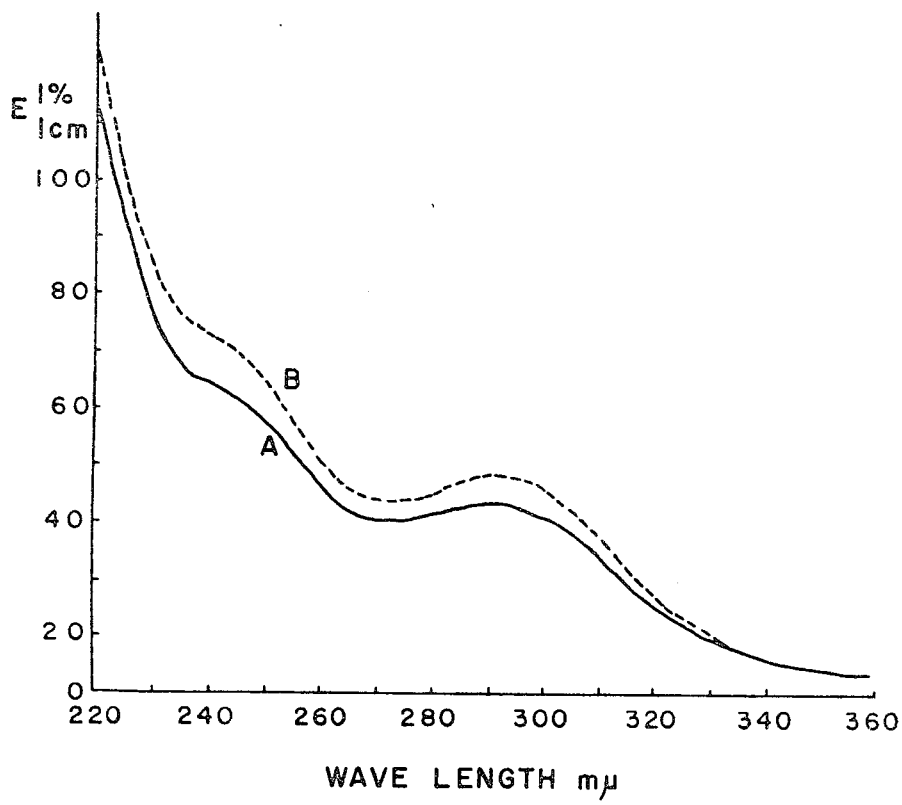
FIG. 1 shows the ultraviolet absorption spectra of bleomycin A and bleomycin B.

The absorption spectra of bleomycin A and B are shown in FIG. 1, indicating absorption at 243–244 m$\mu$ and maximum at 290–295 m$\mu$.

Figure 2:
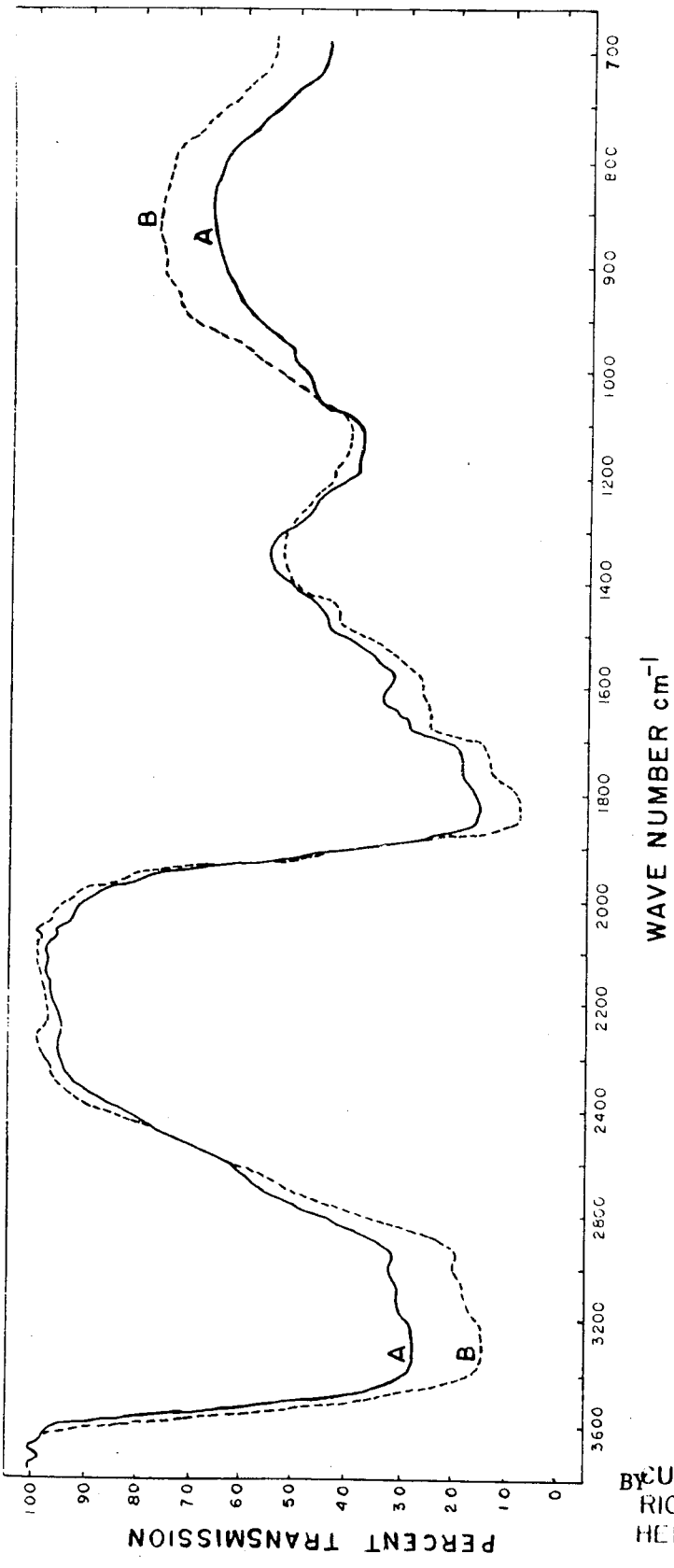
FIG. 2 shows the infrared absorption spectra of bleomycin A and B.

The infrared absorption spectra of bleomycin A and B in KBr tablets are shown in FIG. 2, representing maximum absorptions at wave numbers (cm$^{-1}$) of 3380–3220, 2940, 1715 (sh), 1650, 1635– 1605, 1560–1540, 1510, 1450–1440, 1380–1365, 1250, 1090–0145 and 1010 (sh).

Bleomycin gives positive Pauly, Ehrlich, Dragendorf and permanganate tests but gives negative Molisch, biuret, Elson-Morgan and maltol reactions. As described below, bleomycin A is further separated to six components, all of which give a negative Sakaguchi test. Bleomycin A1, A2 and A3 give negative ninhydrin tests and A4, A5 and A6 give positive ninhydrin tests. Bleomycin B is separated into five components and all give negative ninhydrin and positive Sakaguchi reactions. Thus, bleomycin, bleomycin A and bleomycin B give positive or negative ninhydrin and Sakaguchi reactions, depending on the amount of each component.

On the paper chromatogram developed by 10 percent ammonium chloride, bleomycin appeared at Rf 0.94–0.88 and bleomycin B at Rf 0.70 –0.66. On the paper chromatogram developed by n-propanol: pyridine:acetic acid:water (15:10:3:12), bleomycin A is at Rf 0.50–0.42 and bleomycin B is at Rf 0.57–0.54. In paper chromatography using water-saturated n-butanol containing 2 percent p-toluene sulfonic acid, both bleomycin A and B fail to move from Rf 0 even after 72 hours development.

The aqueous solution of bleomycin absorbed D line, and it was hard to determine its optical rotation.

Since bleomycin is not obtained in the crystalline state, it is hard to determine the molecular formula of bleomycin until the structure will be determined. Moreover, it is hard to reach complete purification of bleomycin A and B. A sample of the hydrochloride of bleomycin B was colored pale blue and it was found to contain metals by fluorescent X-ray analysis. Cu, F and K were shown in the ratio 28:8:0.05. Accordingly, bleomycin B contained 0.27 percent of Cu, if all metals contained in bleomycin B were calculated as Cu. In the case of bleomycin A, the value of Cu was calculated to be 0.08 percent. In the course of purification of bleomycin, it was impossible to separate the greenish color from bleomycin and bleomycin was shown to have a property of chelating with copper. But a sample of purified bleomycin A contained almost no copper.

Bleomycin forms acid addition salts such as hydrochloride, sulfate and its reineckate and helianthate precipitate.

Bleomycin A and B have antimicrobial activity against various bacteria and fungi, including plant pathogens. The activities shown by the agar streak method are as follows:

| Organism | Minimum Inhibitory Concentration (Mcg./cc.) | |
|---|---|---|
| | Bleomycin A | Bleomycin B |
| Staphylococcus aureus (FDA 209P) | 1.6 | 0.8 |
| Staphylococcus aureus (Terajima) | 0.1–0.05 | 0.4 |
| Bacillus anthracis | 25 | 12.5–6.25 |
| Bacillus subtilis (NRRL B–558) | 1.6 | 0.2–0.1 |
| Bacillus subtilis (PCI 219) | 0.025 | 0.1 |
| Sarcina lutea (PCI 1001) | 1.6 | 1.6 |
| Micrococcus flavus (M–16) | 3.125 | 1.6–0.8 |
| Escherichia coli NIHJ | 3.125–1.6 | 0.8–0.4 |
| E. coli (streptomycin fast) | 3.125–1.6 | 1.6–0.8 |
| E. coli (neomycin fast) | 3.125–1.6 | 1.6–0.8 |
| E. coli (chloramphenicol fast) | 1.6–0.8 | 0.8–0.4 |
| E. coli (kanamycin fast) | 3.125–1.6 | 1.6–0.8 |
| E. coli (streptomycin fast) | 3.125–1.6 | 1.6–0.8 |
| Klebsiella pneumoniae (PCI 602) | 3.125–1.6 | 1.6–0.8 |
| Salmonella typhi 63 | 3.125–1.6 | 1.6 |
| Salmonella typhimurium 1406 | 1.6–0.8 | 0.4–0.2 |
| Salmonella paratyphi A1015 | 1.6–0.8 | 1.6 |
| Salmonella paratyphi B8006 | 1.6–0.8 | 3.125–1.6 |
| Salmonella paratyphi C Hirschfeld S–33 | 0.8 | 0.2 |
| Salmonella cholerac suis 1348 | 0.8–0.4 | 0.4–0.2 |
| Shigella dysenteriae 2–1684 | 0.2 | 0.4–0.2 |
| Shigella dysenteriae Ohara | 50–25 | 12.5 |
| Shigella flexneri 1a–1701 | 0.2 | 0.4–0.2 |
| Shigella boydii 1–65 | 1.6–0.8 | 0.8–0.4 |
| Shigella sonnei 1–1196 | 1.6–0.8 | 0.4 |
| Proteus vulgaris OX–19 | 0.4 | 0.2 |
| Pseudomonas pyogenes A3 | 100 | 100 |
| Corynebacterium xerosis | 0.1–0.05 | 0.2–0.1 |
| Mycobacterium phlei | 0.0004–0.0002 | 0.004–0.0002 |
| Mycobacterium 607 | 0.2 | 0.4 |
| Mycobacterium (streptomycin fast) | 0.1–0.05 | 0.1 |
| Mycobacterium (kanamycin fast) | 0.1–0.05 | 0.2–0.1 |
| Cladosporium sphaersperum | 50 | 100 |
| Collectrichum phomoides | 25 | 50 |
| Corticium centrifugus | 1.6 | 3.2 |
| Fusarium lini | 25 | 100 |
| Fusarium oxysporum | 50 | 100 |
| Fusarium roseum | 1.6 | 6.2 |
| Gibberella fujikuroi | 100 | 100 |
| Gibberella saubinetii | 100 | 100 |
| Gloeosporium kaki | 0.8 | 1.6 |
| Glomerella laginarium | 1.6 | 6.2 |
| Helminthosporium seanum | 0.4 | 0.8 |
| Oiricularia grisea | 50 | 100 |
| Piricularia oryzae | 100 | 100 |
| Selerotium roefsii | 0.2 | 1.8 |
| Pseudomonas solanacearum | 100 | 100 |
| Xanthomanas oryzae | 0.4 | 0.8 |
| Asperigillus niger | 100 | 100 |
| Candida albicans 3417 | 100 | 100 |
| Candida albicans YU–1200 | 100 | 100 |
| Cryptococcus neoformans 7496 | 6.2 | 100 |
| Histoplasma capsulatum 4206 | 0.4 | 1.6 |
| Trichophyton mentagrophytes 640 | 100 | 100 |
| Botritis bassiana | 100 | 100 |
| Saccharomyces cervisiae 11299 | 25 | 100 |
| Saccharomyces cervisiae petit. | 12.5 | 25 |

The toxicity of bleomycin was low and the intravenous injection of 8 mg./mouse did not cause death.

Bleomycin inhibited experimental animal tumors, such as sarcoma 180, Ehrlich tumor in mice, by the daily injection of 25 mcg./mouse for 10 days. HeLa cells in tissue culture was inhibited at 25–12.5 mcg./cc. but Yoshida sarcoma cell in tissue culture was not inhibited at 10 mcg./cc. Bleomycin A showed stronger activity than B to Ehrlich carcinoma and sarcoma 180.

In order to confirm bleomycin to be a new substance, it is necessary to compare bleomycin with known antibiotics as follows. Among known antibiotics inhibiting Gram-positive and Gram-negative bacteria, streptomycin, kanamycin and paromomycin are easily differentiated from bleomycin, in respect of the paper chromatograph using water-saturated butanol containing p-toluene sulfonic acid, inhibition of their resistant organisms, and the antibacterial spectrum. Since bleomycin is produced by the whorl-forming streptomyces, it is necessary to compare bleomycin with actinospectacin or phleomycin which are produced by streptomycetes forming whorls. Actinospectacin is differentiated by the fact that actinospectacin inhibits Staphylococci at 10–100 mcg./cc. and it is not inhibitory against sarcoma 180 of mice, being different from bleomycin.

Phleomycin, which was discovered by the present inventors, has inhibitory activity against Gram-positive and Gram-negative bacteria, Ehrlich carcinoma and sarcoma 180 of mice, and the strain producing phleomycin has many common characters with the bleomycin-producing strain. Accordingly, it is necessary to compare bleomycin carefully with phleomycin. When their antibacterial activities were compared with each other, significant differences revealed were as follows:

| Test Organism | Bleomycin A | Bleomycin B | Phleomycin |
|---|---|---|---|
| | | Minimum Inhibitory Concentration Mcg./cc. | |
| Staphylococcus aureus FDA 209P | 0.8 | 1.6 | 0.025 |
| Bacillus subtilis PCI 219 | 0.025 | 0.1 | 0.0001 |
| Escherichia coli NIHJ | 3.125–1.6 | 0.8–0.4 | 0.1 |
| Klebsiella pneumoniae PCI 602 | 3.125–1.6 | 1.6–0.8 | 0.4 |
| Mycobacterium 607 | 0.2 | 0.4 | 0.0125 |
| Selerotium roefsii | 0.2 | 1.8 | 50 |

Bleomycin can be differentiated from phleomycin also in respect of stability in acid and alkaline state. Thus aqueous solutions of phleomycin and bleomycins A and B at 100 mcg./cc. were adjusted to pH 2 and 9 and were kept at room temperature. After storage for the specified period of time a part of each solution was taken out and measured for activity against *Mycobacterium phlei*. The result is shown in the following table; bleomycin is significantly more stable at acid and alkaline pH than phleomycin.

| pH | Substances | Remained Activity (%) After Storage of | | | | | |
|---|---|---|---|---|---|---|---|
| | | 0 min. | 15 min. | 30 min. | 60 min. | 120 min. | 240 min. |
| 2 | Bleomycin A | 100 | 100 | 87 | 85 | 59 | 53 |
| | Bleomycin B | 100 | 100 | 80 | 84 | 63 | 46 |
| | Phleomycin | 89 | 85 | 53 | 39 | 21 | 20 |
| 9 | Bleomycin A | 100 | 100 | 74 | 65 | 48 | 20 |
| | Bleomycin B | 78 | 61 | 49 | 37 | 33 | 20 |
| | Phleomycin | 8 | 8 | 8 | 8 | 2 | 1 |

Bleomycin and phleomycin can be differentiated also on paper chromatography developed with 10 percent ammonium chloride. That is, bleomycin A gives Rf 0.94–0.88, whereas phleomycin shows two to six spots at Rf below 0.81. Bleomycin B is not differentiated from phleomycin by paper chromatography but they can be differentiated by the difference in their absorption of ultraviolet light. Phleomycin shows two absorption maxima at 244–246 and 301 m$\mu$, while bleomycin B shows absorption at 243–244 m$\mu$ and maximum absorption at 291–295 m$\mu$ of which $E_{1cm}^{1\%}$ is larger than that of phleomycin at 301 m$\mu$.

Properties of bleomycin, bleomycin A and bleomycin B which are obtained from the cultured broth by the ion exchange resin and Sephadex G 25 chromatography were described and they were enough to differentiate bleomycin from known antibiotics. Thin layer chromatography of bleomycin using Silica gel G and 10 percent ammonium acetate-methanol (1:1) shows A1, A2, A3, A4, A5, A6 in bleomycin A and B1, B2, B3, B4, B5 in bleomycin B. Bleomycin A and B have a property of chelating with copper and they were more easily purified in their copper-containing forms. Therefore, the further purification, that is, the separation to each of their components, was made in their copper-containing forms. The alumina chromatography was also a helpful process for the purification, and, though the occurrence of an increase in toxicity was suggested to be caused by this process, in order to clarify the physico-chemical property of each component of bleomycin, alumina chromatography was used. When bleomycin was dissolved in methanol and treated by alumina chromatography using methanol, bleomycin increased in toxicity to mice (three to four times) and the therapeutic index of bleomycin thus treated became three to four times smaller than bleomycin before the treatment. Therefore, a slight structural change was suggested to occur during this process. For convenience, bleomycin A and B treated by the alumina chromatography were designated bleomycin At and Bt respectively. The copper-containing At and Bt were designated Cu—At and Cu—Bt and they were obtained by addition of copper chloride. Cu—At and Cu—Bt were further purified by gradient column chromatography using CM Sephadex C25 and aqueous ammonium formate, the concentration of which was raised from 0.1 M to 1.0 M. Cu—At were separated to six active components designated Cu—At1, Cu—At2, Cu—At3, Cu—At4, Cu—At5, and Cu—At6. Cu—Bt were separated to 5 components designated Cu-Bt1, Cu—Bt2, Cu—Bt3, Cu-Bt4 and Cu—Bt5. Generally, Cu—At2 and Cu—At5 were the main components of Cu—At, and Cu—Bt2 and Cu—Bt4 were the main components of Cu—Bt. The concentrations of ammonium formate where each of these components was eluted, Rf of each component by the paper chromatography using 10% NH$_4$Cl (PPC), Rf values on the thin layer chromatography using Silica gel G and 10 percent ammonium acetate-methanol (1:1) (TLC), and relative mobility (Rm) by the high voltage electrophoresis using formic acid-acetic acid-water (25:75:900 in volume, pH 1.8) under 2000V and 25 mA (HVE) are shown in the following table. Rm values were calculated, taking L-alanine as the standard (Rm 1.0).

| Cu-At and Cu-Bt | Concentration of formate in M | Rf on PPC | Rf on TLC | Rf by HVE |
|---|---|---|---|---|
| Cu-At1 | 0.10–0.15 | 0.92 | 0.74 | 0.66 |
| Cu-Bt1 | 0.10–0.15 | 0.71 | 0.75 | 0.58 |
| Cu-At2 | 0.15–0.20 | 0.83 | 0.40 | 0.79 |
| Cu-Bt2 | 0.20–0.25 | 0.72 | 0.68 | 0.74 |
| Cu-At3 | 0.20–0.25 | 0.85 | 0.13 | 0.91 |
| Cu-At4 | 0.30–0.35 | 0.85 | 0.49 | 0.92 |
| Cu-Bt3 | 0.30–0.35 | 0.71 | 0.68 | 0.80 |
| Cu-At5 | 0.35–0.40 | 0.86 | 0.51 | 0.84 |
| Cu-Bt4 | 0.40–0.45 | 0.72 | 0.60 | 0.78 |
| Cu-Bt5 | 0.55–0.60 | 0.70 | 0.52 | 0.86 |
| Cu-At6 | 0.55–0.60 | 0.88 | 0.30 | 0.84 |

In the paper chromatography using 10 percent ammonium chloride, all Cu-At of bleomycin showed Rf values of 0.83–0.92 and all Cu–Bt showed Rf values of 70–0.72. All Cu—At and Cu—Bt showed positive Pauly, Ehrlich, Dragendorf and permanganate reactions. Cu—At1, Cu—At2 and Cu—At3 gave negative ninhydrin. Cu—At4, Cu—At5 and Cu—At6 gave positive ninhydrin. All Cu—Bt gave negative ninhydrin. All Cu—At gave negative Sakaguchi and all Cu—Bt gave positive Sakaguchi reactions. All Cu—At and Cu—Bt gave negative Tollens, Ferric chloride, Fehling and Molisch reactions. All Cu—At and Cu—Bt showed a similar type of ultraviolet spectra having maxima at 244 m$\mu$ and at 295 m$\mu$ and the spectra of Cu—At2 and Cu—Bt2 are shown in FIG. 3. The infrared spectra of Cu—At2 and Cu—Bt2 are shown in FIG. 4. The elemental analysis of Cu—At2 showed the following result: Cu, 5.41. Cu—At and Cu—Bt gave the copper-free form by the treatment with 8-hydroxy-quinoline or with dithizone at acid pH. Comparing the antitumor activities, Cu—At2 and Cu—At5 showed a higher therapeutic index than Cu—Bt2 and Cu—Bt4. Cu—At5 showed the highest therapeutic index.

A more definite comparison of bleomycin with phleomycin can be made by the comparison of each component of bleomycin with each component of phleomycin. A blue powder of phleomycin containing copper at 4.38 percent which was obtained by the ion exchange resin process followed by alumina chromatography was further purified by step-wise elution from CM Sephadex C25 column using ammonium formate (1–5 percent), that is, principally by the same process used for bleomycin. Then phleomycin was separated into phleomycins A, B, C, D1, D2, E, F, G, H, I. The concentrations of ammonium formate at which each component was eluted was as follows: A and B 0.79M, C, 0.16M, D1 and D2, 0.24M, E, 0.32M, F, 0.395M, G, 0.47M, H, 0.63M, I, 0.71M. All phleomycins were differentiated from all bleomycin Cu—At by paper chromatography using 10% $NH_4Cl$ and by Sakaguchi reaction. All phleomycins showed Rf below 0.80 and gave positive Sakaguchi reaction. All phleomycin except C, D2, F had maxima at 244 m$\mu$ ($E_{1cm}^{1\%}$ 120–140 and 301 m$\mu$ ($E_{1cm}^{1\%}$ 40–50) and were differentiated from all bleomycin Cu—At and Cu—Bt. Phleomycin C, D2 and F had maxima at 244 m$\mu$ ($E_{1cm}^{1\%}$ 120–145) and 295 m$\mu$ ($E_{1cm}^{1\%}$ 90–115), and this ultraviolet spectrum was similar to those of Cu—At and Cu—Bt of bleomycin. Therefore, C, D2 and F were carefully compared with Cu—Bt group of bleomycin. Then, bleomycin Cu—Bt2 and Cu—Bt5 were not differentiated from phleomycin C and F, respectively. Others were differentiated by the thin layer chromatography. Phleomycins gave positive Ehrlich, Dragendorf and Sakaguchi, but negative ninhydrin tests. All phleomycins and bleomycins gave a positive test for sulfur.

Bleomycin is promising to be useful for therapy against infectious bacterial diseases of human, animal or plant.

Examples of processes for production and isolation of bleomycin are described below. It is apparent to specialists who are skilled in this field that the variation or modification of the processes here described can be easily made on the basis of cultural properties which are known in streptomycetes and on the basis of the properties of bleomycin above described.

The next examples are given merely for illustrative purposes only and the invention is not limited to those examples.

EXAMPLE 1

The strain B80–Z2 was shake-cultured in medium consisting of 1 percent glucose, 1 percent starch, 0.75 percent meat extract, 0.75 percent peptone and 0.3% NaCl (the initial pH 7.0) at 27°–28° C. for 5 days. Mycelium mass was removed from the cultured broth by filtration and the filtrate of 3.4 liters contained 1.23 mg. of bleomycin. The filtrate (pH 7.8) was adjusted to pH 6.4 and passed through the column of 300 cc. of IRC–50 (H type) (2.8 cm. in diameter). The flow rate was 10 cc. per minute. After passing of the broth filtrate, the column was washed with distilled water. The effluent and the wash water showed no potency, suggesting bleomycin adsorption. This column was eluted with 0.2 N HCl at flow rate of 5 cc. per minute and the eluate was fractionated to each 50 cc. The fractions up to 12th had pH 5.4 –4.8, and did not contain bleomycin. At the 13th fraction and thereafter, the pH decreased to 2.0. At the 14th fraction, the pH value decreased to below 1. Bleomycin was contained in 450 cc. of 13th –21st fractions. These fractions were neutralized with Amberlite IR–4B (OH type) immediately after the elution. The active fractions were combined and lyophilized. The lyophilized powder was extracted with methanol (30 cc.) and separated from the residue. The residue was extracted twice with 10 cc. of methanol. These methanol extracts were combined and dropped into ethyl ether (500 cc.). The precipitate occurring was collected by centrifugation and dried in vacuo at room temperature, yielding a brownish colored powder of 1.808 g. This powder contained 1.2 mg. of bleomycin and 1 mg. of this powder contained 0.67 mcg. of bleomycin.

EXAMPLE 2

From the powder of bleomycin hydrochloride which was obtained in Example 1 and which had the activity of 0.67 mcg./mg. 1.7 g. was taken and extracted with ethanol of 25 cc. Ethanol-insoluble powder was dissolved in methanol, and this methanol solution was passed through the column (1.3 cm. in diameter) of 5 g. alumina (Grade 1). From this column, elution was made by methanol, 10 percent aqueous methanol and 20 percent aqueous methanol successively. Bleomycin was eluted in absolute methanol and 10 percent aqueous methanol. This bleomycin-containing eluate was concentrated in vacuo and dried, yielding 550 mg. of brownish-colored powder containing bleomycin hydrochloride at 1.7 mcg./mg.

EXAMPLE 3

Each 10 liters of a medium consisting of 3.5 percent soybean flour, 2.5 percent starch, 0.5 percent glucose, 0.3% NaCl, 0.1% $K_2HPO_4$, 0.05 percent zinc sulfate and 0.01% $CuSO_4$ (the initial pH 7.0) was placed in two stainless steel jar fermentors (30 liters in volume) and sterilized. This medium was inoculated with 600 cc. of the shaking-cultured broth of the strain B80–Z2 in the same medium for 2 days. Fermentation proceeded under aeration of 10 l. per minute and stirring at 500 rpm. at 27°–29° C. Silicone oil was added at 0.0033 percent as the antifoaming agent to the medium before the start of the fermentation and during the fermentation a total of 50 cc. of soybean oil was added. The broth was sampled (10 cc.) at various days during the fermentation and the pH and the content of bleomycin were found to be as follows:

| Fermentor | | 2 | 3 | Days 4 | 5 | 6 | 8 | 9 | 10 |
|---|---|---|---|---|---|---|---|---|---|
| No. 1 | pH | 5.8 | 5.8 | 6.4 | 6.4 | 6.2 | 5.4 | 5.7 | 6.2 |
|  | Mcg./cc. | – | – | – | – | 4.5 | 5.8 | 18.2 | 80.0 |
| No. 2 | pH | 5.8 | 5.8 | 5.4 | 5.8 | 5.0 | 5.0 | 5.8 | 6.0 |
|  | Mcg./cc. | – | – | – | – | 4.5 | 5.1 | 13.7 | 29.5 |

After 10 days' fermentation, the broth of two jar fermentors was cooled and adjusted to pH 4.6 by HCl. The mycelium was removed by the continuous cold centrifuge and filtered by filter paper to yield the clear filtrate. The filtrate of 11 liters thus obtained contained 358.5 mg. of bleomycin. This filtrate was passed through a column (5.5 cm. in diameter) of Amberlite IRC–50 of 1750 cc. After washing this column with distilled water, elution was made by 0.2 N HCl.

Bleomycin in the eluate is shown in the following table.

| Fraction No. | Volume cc. | pH | Bleomycin content Mcg./cc. | Mg. |
|---|---|---|---|---|
| 1 | 580 | 4.8 | 0 | 0 |
| 2 | 1830 | 4.8 | 1.62 | 2.9 |
| 3 | 480 | 2.0 | 145.5 | 69.5 |
| 4 | 650 | 1.0 | 387.5 | 252.5 |
| 5 | 550 | 1.0 | 62.5 | 24.4 |
| 6 | 430 | 1.0 | 34.5 | 14.6 |

The fractions of No. 3–6 were combined and neutralized by Amberlite IR–4B (OH type). The neutral eluate was concentrated in vacuo. The concentrated solution was washed with acetone and dried in vacuo. The brownish powder thus obtained was extracted with methanol (150 cc.). The methanol-insoluble part (11.59 g.) contained 57.5 mg. of bleomycin (4.98 mcg./mg.). The methanol solution was distilled and dried to powder. This powder was extracted with ethanol of 100 cc. The ethanol-insoluble powder (4.038 g.) contained 293 mg. of bleomycin (72.5 mcg./mg.). This grayish powder was dissolved in distilled water (5 cc.) and applied to the column of Sephadex G–25 (200 cc., 2.0 cm. in diameter). Thereafter elution was made by distilled water. The effluent was cut into fractions of 5 cc. each and each fraction was lyophilized.

| Fraction No. | Color | Effluent Bleomycin Mcg./cc. | Lyophilized Powder Content Mg. | Wt. Mg. | Bleomycin Mcg./Mg. | Content Mg. |
|---|---|---|---|---|---|---|
| 1–10 | Colorless | 0 | 0 | – | – | – |
| 11–13 | Pale Brown | – | – | 62.3 | 0.24 | 0.15 |
| 14 | Pale Brown | – | – | 29.5 | 5.6 | 0.17 |
| 15 | Pale Brown | 0.02 | 0.11 | 36.4 | 3.49 | 0.13 |
| 16 | Pale Brown | 0.084 | 0.42 | 45.1 | 2.84 | 0.13 |
| 17 | Pale Brown | 0.184 | 0.92 | 53.0 | 16.50 | 0.88 |
| 18 | Pale Brown | 0.256 | 1.26 | 30.6 | 70.00 | 2.14 |
| 19 | Brown | 0.555 | 2.78 | 68.0 | 76.00 | 5.15 |
| 20 | Brown | 0.21 | 1.53 | 115.0 | 30.60 | 3.53 |
| 21 | Brown | 0.21 | 1.04 | 86.2 | 21.35 | 1.83 |
| 22 | Greenish Brown | 12.9 | 64.5 | 160.4 | 275.00 | 44.0 |
| 23 | Green | 14.0 | 69.5 | 233.3 | 339.00 | 49.5 |
| 24 | Green | 11.4 | 57.0 | 244.6 | 310.00 | 76.0 |
| 25 | Green | 8.05 | 40.3 | 249.5 | 332.00 | 82.5 |
| 26 | Pale Yellowish Green | 6.23 | 31.3 | 270.5 | 192.00 | 52.0 |
| 27 | Pale Yellowish Green | 1.56 | 7.75 | 331.9 | 51.00 | 26.9 |
| 28 | Pale Yellow | 0.78 | 3.91 | 371.4 | 12.20 | 4.60 |
| 29–32 | Pale Yellow | 0.29 | 5.75 | 1192.5 | – | – |

The above fractions containing bleomycin were paper chromatographed using Toyo filter paper No. 51 developed with 10 percent ammonium chloride solution by ascending method. After development for 3–4 hours, the solvent ran about 30 cm. and the filter paper was dried in air. Bioautographs of the paper chromatograms were made against *Mycobacterium phlei*. As to results, fractions No. 13–15 showed a small inhibition zone at Rf 0.51–9.57, fractions No. 16–23 showed a large inhibition zone at 0.94–0.88 (bleomycin A), and No. 24–29 at 0.70–0.66 (bleomycin B). In the fractions after the 30th, another substance showing a partial inhibition at Rf 0.83 was detected besides bleomycin B at Rf 0.70–0.66.

EXAMPLE 4

The fraction No. 24 of Sephadex G–25 chromatography in Example 3 gave 244.6 mg. of bleomycin powder (containing 76 mg. of bleomycin, 310 mcg./mg.) and this powder was dissolved in 20 cc. of warm methanol. After cooling, the insoluble powder of 35.5 mg. (containing 1.49 mg. of bleomycin, 42 mcg./mg.) was filtered off, and to the methanol solution ethanol of 20 cc. was added to result in a finely powdered precipitate. This powder of 46.9 mg. (containing 1.87 mg. of bleomycin, 39.8 mcg./mg.) was removed by filtration and the filtrate did not produce any more precipitate by addition of 70 ml. ethanol. This solution was distilled in vacuo and yielded a practically colorless precipitate of bleomycin. After concentration to 20 cc. volume, it was kept at 0°–5° C. for 6 hours and pale bluish powder (95 mg.) was obtained after filtration and drying. This powder decomposed at 192°–196° C. on microblock and contained 742.5 mcg. of bleomycin hydrochloride per one mgm. By paper chromatography developed with ammonium chloride, this powder was shown to be bleomycin B.

On the other hand, 100 mg. of fraction No. 22 (containing 27.5 mg. of bleomycin, 275 mcg./mg.) was treated in the same way as above and finally a purified white powder (27.9 mg.) was obtained.

EXAMPLE 5

Powder (633 mg.) containing 0.65 mg. (1.03 mcg./mg.) bleomycin was applied to a column (1 cm. in diameter) of cellulose powder (10 g.) which was treated with a mixture of n-propanol-pyridine-acetic acid-water (15:10:3:2 in volume ratio). The partition chromatography was made by the same solvent mixture. All bleomycin was found in fractions No. 6–16 when the effluent was fractionated by 5 cc. These active fractions were collected and concentrated to about 5 cc. volume. Ethyl ether (50 cc.) was added to this 5 cc. to yield a precipitate of bleomycin. After drying this precipitate it was washed with ethanol and the methanol-insoluble part was removed. THe methanol-soluble part was dropped into ethyl ether (10 volumes) and yielded a powder weighing 36.27 mg. and containing 0.62 mg. of bleomycin (1.7 mcg./mg.).

EXAMPLE 6

A brown powder (1980 g.) showing an activity of 3 µg/mg. which was obtained by the IRC-50 resin process from culture filtrate, was dissolved in methanol at the rate of 4 cc./g. The insoluble part was discarded. The methanol solution was concentrated in vacuo at 20°-30 C. almost to dryness, and ethanol was added at the rate of 2 cc./g. Ethanol was removed. The dried powder thus obtained contained bleomycin, and this powder was further treated twice by the same procedure, that is, dissolution in methanol (4 cc./g.), concentration in vacuo and addition of ethanol (2 cc./g.). Then, 58.1 g. of a brownish powder showing an activity of 93 µg/mg. was obtained. Thirty-four g. of this powder was dissolved in 170 cc. of methanol and to this methanol solution 27.2 cc. of 5 percent copper chloride in methanol was added. This amount of copper chloride solution was determined by testing the necessary amount for the chelation which was determined by the optical density at 620 mµ. The solution was kept for 30 minutes at room temperature and filtered. The filtrate was applied to the alumina column (340 g. of alumina in methanol). Methanol was further passed and the eluate obtained from the blue ring was evaporated in vacuo, yielding 7.9 g. of blue powder containing bleomycin Cu—At and Cu—Bt. If the activity is shown by the comparison with the working standard of bleomycin, it showed 215 µ g/mg. Four g. of this powder was dissolved in distilled water and the solution was applied to Sephadex G-25 column (4 × 80 cm.). The flow rate was 0.5 cc./m. When the blue band on the column came down, the blue eluate was cut into three parts depending on the results of the paper chromatographic analysis. From the first part, 517 mg. of the blue powder showing an activity of 506 µg/mg. was obtained. It was shown to contain bleomycin Cu—At (Rf 0.85-0.95) by paper chromatography using 10% $NH_4Cl$. The second part gave a blue powder of 166 mg. showing an activity of 520 µg/mg. and was shown to contain Cu—At and Cu—Bt. The third part gave a blue powder of 3154 mg. showing an activity of 111.6 µg/mg. and was shown to contain Cu—Bt (Rf 0.70-0.75) by a similar procedure from another culture filtrate, a blue powder of Cu—At, 1.903 g. was obtained, and it showed an activity of 269 µg/mg. This powder was dissolved in 0.1M ammonium formate (pH 6.4) and applied to CM Sephadex C-25 column (2 × 35 cm.). Gradient elution was carried out by increasing the concentration of ammonium formate from 0.1M to 1.9M. The optical density of the effluent was continuously read at 253 mµ and the fractions containing a single substance were combined and lyophilized. Thus, the following components were obtained: Cu—At1 33.9 mg. (300 µg/mg.); Cu—At2 220 mg. (644 µg/mg.); Cu—Bt2 which contaminated in Cu—At 7.2 mg. (2240 µg/mg.); Cu—At3 15.1 mg. (671 µg/mg.); Cu—At4 3.6 mg.; Cu—At5 72.7 mg. (1460 µg/mg.); Cu—Bt4 (contamination in Cu—At) 8.8 mg. (2800 µg/mg.); Cu—At6 3.5 mg. By the same procedure of CM Sephadex C-25 chromatography, starting from 1.908 g. of Cu—Bt showing an activity of 345 µg/mg., the following active components were obtained: Cu—Bt2 125.2 mg. 2240 µg/mg.); Cu—Bt4 50 mg. (2100 µg/mg.). From other samples of Cu—Bt1, Cu—Bt3 or Cu—Bt5 was obtained in a small quantity together with Cu—Bt2 and Cu—Bt4.

EXAMPLE 7

Bleomycin Cu—At, 525.2 mg. showing an activity of 94 µg/mg. which was obtained by the process shown in Example 6, was dissolved in 40 ml. of 0.1N HCl and extracted repeatedly with chloroform containing dithizone at 0.5 percent until no reddish violet color remained. After chloroform was removed, the solution was neutralized with Dowex-3 resin and lyophilized. Thus, copper was removed and a white powder (475 mg.) was obtained which showed an activity of 112 µg/mg.

Bleomycin has a peak at 293-295 mµ in its ultraviolet absorption spectrum. Acid hydrolysis in 6N HCl at b 105° C. yielded more than eight ninhydrin positive products. One of them was crystallized and the following properties were observed: the analytical data suggested the formula of $C_9H_{11}N_3O_3S_2$ or $C_{19}H_{22}N_6O_6S_4$; λmax 293 mµ ($E_{1cm}^{1\%}$ 490), yellow by ninhydrin reaction, pK 3.0 and 9.2. It is unstable at alkaline pH. On the basis of the ultraviolet absorption it must be a chromophoric amino acid contained in all bleomycins.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:

1. The process of producing a biologically active complex, identified as bleomycin, which comprises cultivating Streptomyces verticillus ATTC 15003 at a temperature of about 25° C. to 35° C. for at least 2 days under submerged aerobic conditions in an aqueous assimilable carbohydrate solution containing an assimilable nitrogenous nutrient until the substantial amount of the said antibiotic is produced in said medium.

2. The process of producing a biologically active complex, identified as bleomycin A, which comprises cultivating Streptomyces verticillus ATTC 15933 at a temperature of about 25° C. to 35° C. for at least 2 days under submerged aerobic conditions in an aqueous assimilable carbohydrate solution containing an assimilable nitrogenous nutrient until the substantial amount of the said antibiotic is produced and then recovering from the broth the bleomycin A thus produced by adsorption on a cation exchange resin and subsequent elution therefrom and then separating the bleomycin A from the bleomycin B present therewith by chromatography, said bleomycin A being the fraction which exhibits an Rf value of 0.88-0.94 by paper chromatography using 10% $NH_4Cl$.

3. A biologically active complex identified as bleomycin A which is prepared by the process of claim 2 and which inhibits Gram-positive and Gram-negative bacteria, inhibits Ehrlich carcinoma, is soluble in water and methanol, and practically insoluble in ethanol, butanol, acetone, ethyl acetate, chloroform and benzene, forms salts with acids, chelates with copper, shows two ultraviolet absorption maxima at 254 mµ and 295 mµ, gives positive Pauly, Ehrlich, Dragendorf tests, gives negative Sakaguchi, Fehling, Tollens and Molisch tests and shows Rf 0.88-0.94 by paper chromatography using 10% $NH_5Cl$.

4. The process of producing a biologically active substance identified as bleomycin A2 which is one of the main active components of bleomycin A and which gives a negative ninhydrin reaction, gives positive Pauly, Ehrlich, Dragendorf and permanganate tests and negative Sakaguchi, Fehling, Tollens, ferric chloride and Molisch tests, contains C, H. N, S and O and exhibits the ultraviolet absorption spectrum shown in FIG. 3 and the infrared absorption spectrum shown in FIG. 4 after is has been purified as its copper-containing form designated Cu–At2 in said Figures, said process comprising cultivating Streptomyces verticillus ATTC 15003 at a temperature of about 25° C. to 35° C. for at least two days under submerged aerobic conditions in an aqueous assimilable carbohydrate solution containing an assimilable nitrogeneous nutrient until the substantial amount of the said antibiotic is produced and then recovering from the broth the bleomycin A2 thus produced by adsorption on a cation exchange resin and subsequent elution therefrom and then separating the bleomycin A2 from the other bleomycins present therewith by chromatography as the fraction which exhibits in its copper-containing from an Rf of about 0.40 in thin layer chromatography using silica gel and 10 percent ammonium acetate-methanol (1:1) and a negative Sakaguchi reaction.

5. A biologically active substance identified as bleomycin A2 which is prepared by the process of claim 4 and which gives a negative ninhydrin reaction, gives positive Pauly, Ehrlich, Dragendorf and permanganate tests and negative Sakaguchi, Fehling, Tollens, ferric chloride and Molisch tests, contains C, H, N, S and O and exhibits the ultraviolet absorption spectrum shown in FIG. 3 and the infrared absorption spectrum shown in FIG. 4 after it has been purified as its copper-containing form designated Cu–At2 in said Figures.

6. The process of producing a biologically active substance identified as bleomycin A5 in its copper-free form and as Cu–At5 in its copper-containing form which is one of the main components of bleomycin A and which gives a positive ninhydrin reaction, and gives positive Pauly, Ehrlich, Dragendorf and permanganate tests and negative Sakaguchi, Fehling, Tollens, ferric chloride and Mollisch tests, and exhibits the ultraviolet absorption spectrum shown in FIG. 3 and the infrared absorption spectrum shown in FIG. 4 after it has been purified as its copper-containing form designated Cu–At5 in said Figures, said process comprising cultivating Streptomyces verticillus ATCC 15003 at a temperature of about 25° C. to 35° C. for at least two days under submerged aerobic conditions in an aqueous assimilable carbohydrate solution containing an assimilable nitrogenous nutrient until the substantial amount of the said antibiotic is produced and then recovering from the broth the bleomycin A5 thus produced by adsorption on a cation exchange resin and subsequent elution therefrom and then separating the bleomycin A5 from the other bleomycins present therewith by chromatography as the fraction which exhibits in its copper-containing form an Rf of about 0.51 in thin layer chromotography using silica gel and 10 percent ammonium acetate-methanol (1.1) and a negative Sakaguchi reaction.

7. A biologically active substance identified as bleomycin A5 in its copper-free form and as Cu–At5 4 1 in its copper-containing form which is prepared by the process of claim 6 and which gives a positive ninhydrin reaction, and gives positive Pauly, Ehrlich, Dragendorf and permanganate tests and negative Sakaguchi, Fehling, Tollens, ferric chloride and Molisch tests, and exhibits the ultraviolet absorption spectrum shown in FIG. 3 and the infrared absorption spectrum shown in FIG. 4 after it has been purified as its copper-containing form designated Cu–At5 in said Figures.

* * * * *

PO-1050
(5/69)

UNITED STATES PATENT OFFICE
CERTIFICATE OF CORRECTION

Patent No. 3,681,491          Dated August 1, 1972

Inventor(s) Hamao Umezawa, Kenji Maeda, Yoshiro Okami and Tomio Takeuchi

It is certified that error appears in the above-identified patent and that said Letters Patent are hereby corrected as shown below:

In line 3 of Claim 2 for "ATCC 15933" read "ATCC 15003".

In line 8 of Claim 3 for "254" read "244" and in the last line for "$NH_5Cl$" read "$NH_4Cl$".

In line 2 of Claim 7 after "Cu-At5" delete "4 1".

Signed and sealed this 6th day of February 1973.

(SEAL)
Attest:

EDWARD M. FLETCHER, JR.          ROBERT GOTTSCHALK
Attesting Officer          Commissioner of Patents